United States Patent
Jacobson

(10) Patent No.: US 8,644,211 B2
(45) Date of Patent: Feb. 4, 2014

(54) ENERGY-EFFICIENT CONTENT RETRIEVAL IN CONTENT-CENTRIC NETWORKS

(75) Inventor: Van L. Jacobson, Woodside, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 579 days.

(21) Appl. No.: 12/970,802

(22) Filed: Dec. 16, 2010

(65) Prior Publication Data

US 2012/0155348 A1 Jun. 21, 2012

(51) Int. Cl.
*H04B 7/185* (2006.01)
*H04L 12/28* (2006.01)

(52) U.S. Cl.
USPC .......................................... 370/318; 370/401

(58) Field of Classification Search
None
See application file for complete search history.

(56) References Cited

U.S. PATENT DOCUMENTS

| | | | | |
|---|---|---|---|---|
| 2006/0051055 | A1* | 3/2006 | Ohkawa | 386/46 |
| 2006/0223504 | A1* | 10/2006 | Ishak et al. | 455/414.1 |
| 2007/0124412 | A1* | 5/2007 | Narayanaswami et al. | 709/217 |
| 2008/0186901 | A1* | 8/2008 | Itagaki et al. | 370/315 |
| 2009/0030978 | A1* | 1/2009 | Johnson et al. | 709/203 |
| 2011/0239256 | A1* | 9/2011 | Gholmieh | 725/62 |

FOREIGN PATENT DOCUMENTS

EP 2214357 A1 4/2010

OTHER PUBLICATIONS

Jacobson, Van et al., "Networking Named Context", Dec. 2009, pp. 1-13, Retrieved from the Internet: URL: http://conferences.sigcom-morg/co-next/2009/papers/jacobson.pdf (Retrieved on Mar. 6, 2012).

Shih, Eugene et al., "Wake on Wireless: An Event Driven Energy Saving Strategy for Battery Operated Devices", Sep. 23, 2002, pp. 160-171.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

* cited by examiner

*Primary Examiner* — Eunsook Choi

(74) *Attorney, Agent, or Firm* — Shun Yao; Park, Vaughan, Fleming & Dowler LLP

(57) ABSTRACT

One embodiment of the present invention provides a system including a mobile device and a content-retrieving agent for facilitating energy-efficient content retrieval. During operation, the mobile device receives a request for a piece of content from a user. In response to the request, the mobile device forwards the request to the content-retrieving agent which is configured to obtain the requested content from a remote device on behalf of the mobile device. The system allows the mobile device's receiver to be placed in an energy-saving sleep mode when the content-retrieving agent is obtaining the requested content for the mobile device and is not transmitting the content to the mobile device. The system allows the mobile device's receiver to wake up when the content-retrieving agent is transmitting the content to the mobile device. The mobile device receives the content from the content-retrieving agent.

24 Claims, 6 Drawing Sheets

ENERGY-EFFICIENT CONTENT RETRIEVAL IN CONTENT-CENTRIC NETWORKS

RELATED APPLICATION

The subject matter of this application is related to the subject matter of the following applications:

U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/603,336, entitled "ADAPTIVE MULTI-INTERFACE USE FOR CONTENT NETWORKING," by inventors Van L. Jacobson and James D. Thornton, filed 21 Oct. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009;

U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

U.S. patent application Ser. No. 12/765,645, entitled "SESSION MIGRATION OVER CONTENT-CENTRIC NETWORKS," by inventors James D. Thornton, Van L. Jacobson, and Diana K. Smetters, filed 22 Apr. 2010;

U.S. patent application Ser. No. 12/852,302, entitled "SERVICE VIRTUALIZATION OVER CONTENT-CENTRIC NETWORKS," by inventors James D. Thornton, Van L. Jacobson, and Diana K. Smetters, filed 6 Aug. 2010;

U.S. patent application Ser. No. 12/970,740, entitled "CUSTODIAN-BASED ROUTING IN CONTENT-CENTRIC NETWORKS," by inventors Van L. Jacobson and Marc E. Mosko, filed 16 Dec. 2010; and U.S. patent application Ser. No. 12/970,776, entitled "ENERGY-EFFICIENT CACHING WITH CUSTODIAN-BASED ROUTING IN CONTENT-CENTRIC NETWORKS," by inventor Van L. Jacobson, filed 16 Dec. 2010, the disclosures of which are incorporated by reference in their entirety herein.

FIELD

The present disclosure relates generally to content routing in content-centric networks. More specifically, the present disclosure relates to energy-efficient content retrieval in content-centric networks (CCNs).

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., an IP address) closely associated with a physical object or location. This restrictive addressing scheme is becoming progressively more inadequate for meeting ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today' subiquitous, relentlessly growing Internet. People now expect a lot more from the Internet than the ARPAnet was designed to provide. Ideally, an Internet user should have access to any content, anywhere, at any time— access that is difficult to facilitate with the current location/device-binding TCP/IP (transmission control protocol/Internet protocol) networks.

Content-centric networks (CCN), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system including a mobile device and a content-retrieving agent for facilitating energy-efficient content retrieval. During operation, the mobile device receives a request for a piece of content from a user. In response to the request, the mobile device forwards the request to the content-retrieving agent which is configured to obtain the requested content from a remote device on behalf of the mobile device. The system allows the mobile device's receiver to be placed in an energy-saving sleep mode when the content-retrieving agent is obtaining the requested content for the mobile device and is not transmitting the content to the mobile device. The system allows the mobile device's receiver to wake up when the content-retrieving agent is transmitting the content to the mobile device. The mobile device receives the content from the content-retrieving agent.

In one variation on this embodiment, the mobile device, the content-retrieving agent, and/or the remote device are coupled to each other via a content-centric network (CCN).

In a further variation on this embodiment, forwarding the request to the content-retrieving agent involves the mobile device performing a lookup based on the content's name; the content is then mapped to the content-retrieving agent, regardless of whether or not the content is stored on the content-retrieving agent.

In a further variation, obtaining the content from the remote device involves the content-retrieving agent identifying the remote device by performing a lookup based on the content's name.

In one variation on this embodiment, the receiver is placed in the energy-efficient sleep mode for a predetermined amount of time before waking up.

In one variation on this embodiment, the system notifies the content-retrieving agent that the receiver is waking up and is ready to receive the content.

In one variation on this embodiment, the mobile device starts receiving the content from the content-retrieving agent after the content-retrieving agent obtains at least a portion of the content.

In one variation on this embodiment, the mobile device is further configured to receive a cached copy of the content from the content-retrieving agent at a later time.

BRIEF DESCRIPTION OF THE FIGURES

In the figures, like reference numerals refer to the same figure elements.

DETAILED DESCRIPTION

Figure 1:
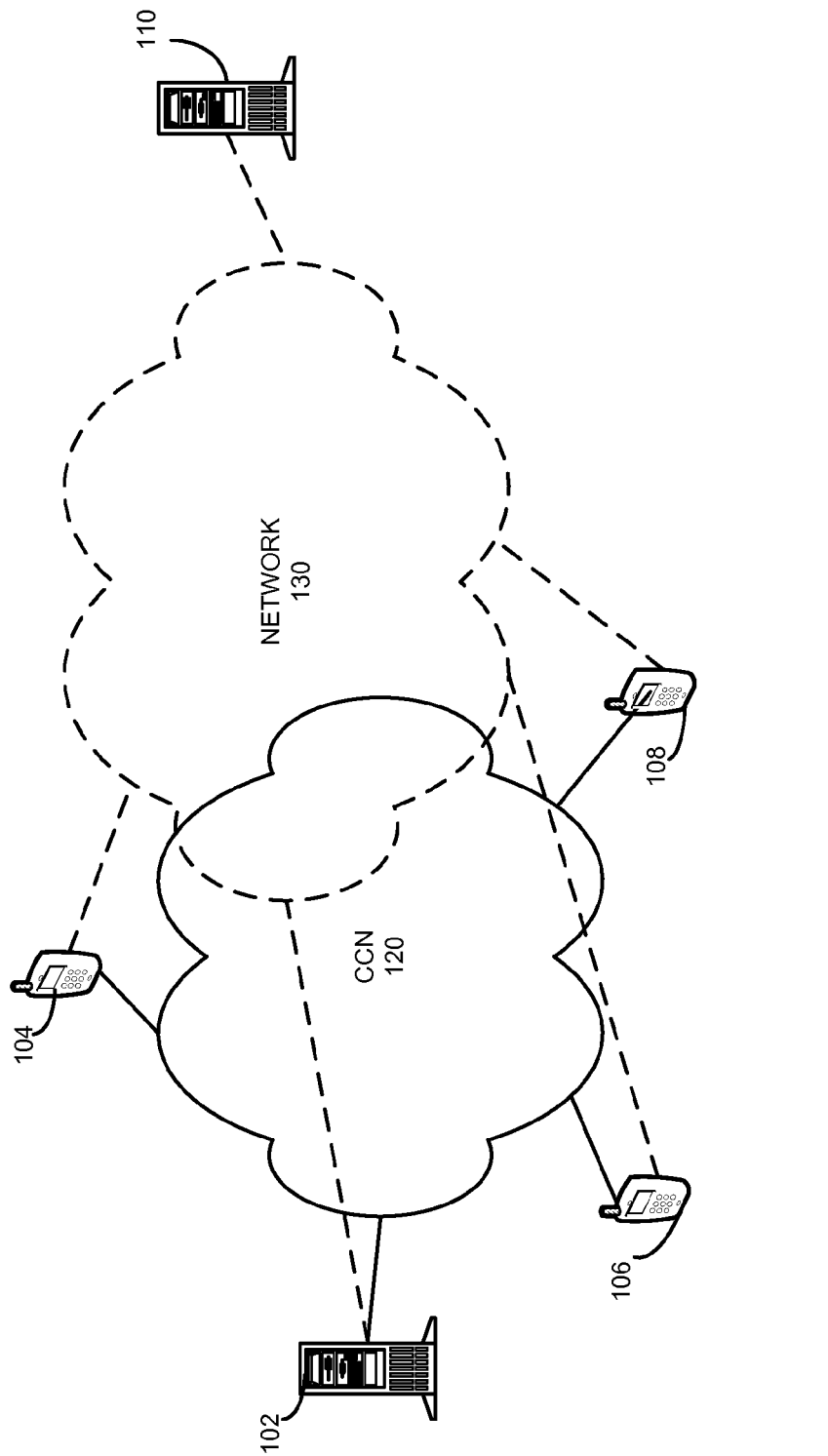
FIG. 1 presents a diagram illustrating the exemplary system architecture for energy-efficient content retrieval in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a solution for a mobile device to obtain content in an energy-efficient way. When an energy-constrained mobile device attempts to retrieve a large piece of content from a remote server or device, instead of leaving the mobile device's receiver powered on for the whole time period, the mobile device can place its receiver into a predetermined energy-saving sleep/awake cycle. To avoid missing incoming packets while the receiver is asleep, the mobile device can designate a stationary device that has no or little energy constraints as its content-retrieving agent, which can retrieve and store the content on behalf of the mobile device. The content-retrieving agent is aware of the sleep cycle of the mobile device's receiver and can transmit the content to the mobile device while its receiver is awake. In addition, the mobile device can send a batch of download requests, such as a batch of content-centric network (CCN) interests, to the designated content-retrieving agent, and place its receiver in sleep mode. The agent downloads the requested content on behalf of the mobile device, wakes the mobile device up after finishing the download, and then provides the content to the mobile device.

Although the instant disclosure is presented using examples based on a CCN, embodiments of the present invention are not limited to CCNs.

The term "custodian" refers to a device that stores the content corresponding to interest. A custodian can be any type of device that is capable of storing data in volatile or non-volatile storage. A custodian can be a mobile computing device, such as a laptop computer, a tablet or slate computer, a smartphone, or a personal digital assistant (PDA), or a stationary computing device, such as a desktop computer or a home media server.

The term "content-retrieving agent" refers to a device that performs content retrieving on behalf of a different device. A content-retrieving agent can be any type of device that is coupled to other remote servers and devices via a network and capable of retrieving data from the other remote servers and devices. In addition, the content-retrieving agent stores data in volatile or non-volatile storage. Due to energy constraint considerations, it is preferable for a content-retrieving agent to be a stationary computing device, such as a desktop computer or a home media server. Alternatively, a mobile computing device can act as a content-retrieving agent for other mobile devices. Examples of mobile devices include, but are not limited to: a laptop computer, a tablet or slate computer, a smartphone, and a personal digital assistant (PDA). Note that the content retrieving agent and the custodian can be the same or different entities.

The term "communication endpoint" refers to a communication interface located on a computing device, through which a remote device can communicate with the computing device. A "communication endpoint" can be any type of communication interface, including, but not limited to: a WiFi™ (trademark of the Wi-Fi Alliance) interface, a 3 G cellular interface, and a Bluetooth™ (trademark of the Bluetooth Special Interest Group of Kirkland, Wash.) interface.

Content-Centric Network

CCN names are opaque, binary objects that include an explicitly specified number of components. In addition, CCN names are persistent and content-specific. That is, if one changes the content of a file or data object, the content is effectively associated with a new name. This persistency can be achieved with an explicit versioning mechanism where, for example, the new content can be "version 4" of a given name. The version is often a timestamp. The persistency can also be achieved implicitly. For example, contents can be associated with not only their human-established names but also with authentication metadata (e.g., a digital signature by the publisher of the content). As a result, the complete content name changes when the data associated with a given name changes.

In a content-centric network (CCN), communication is driven by the consumers of data. In a CCN, there are two packet types, interest and data. An interest packet (also called a "query") is a request for some content. An interest packet encodes a special form of query that expresses what content is desired and what content is not desired. A data packet (also called a "content packet") is a unit of content. Data packets are self-identifying by carrying within them their full name. A consumer asks for content by broadcasting its interest over all available connectivity. Any node hearing the interest and having data that satisfies it can respond with a data packet. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet. An interest may specify the exact version to retrieve or may specify any version greater than a specified version, known as a "get-the-latest-version interest."

Functionally, a CCN can retain associations among various names and the content which they represent. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCNs allow the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Custodian-Based Routing

To enable content sharing among various user devices within a social network group, custodian-based routing has been implemented over a CCN-based content delivery network (CDN) that includes the various user devices. In the CDN implementing custodian-based routing, content is associated with devices storing it, called custodians. A request for a particular piece of content can always be routed to its custodian, regardless of the physical location of the custodian.

To ensure that the requesting party of a piece of content can correctly connect to the custodian of that content, the CCN-based CDN maintains three different types of mapping, including content-prefix-to-custodian mapping, custodian-to-communication-endpoint mapping, and communication-endpoint-to-physical-address mapping. Each time a device interacts with another device, they exchange the three mappings with each other to make sure that the routing information is distributed across the CCN. Alternatively, the communication-endpoint-to-physical-address mapping information can be stored at a third-party service, such as a public Session Initiation Protocol (SIP) server which provides rendezvous service between the requesting party and the custodian.

Details about custodian-based routing can be found in U.S. patent application Ser. No. 12/970,740, entitled "CUSTODIAN-BASED ROUTING IN CONTENT-CENTRIC NETWORKS," by inventors James D. Thornton, Van L. Jacobson, and Marc Mosko, filed Dec. 16, 2010, the disclosure of which is incorporated by reference in its entirety herein.

Content-Retrieving Agent for Energy-Efficiency

A mobile device's long-term energy consumption can be mostly attributed to its receiver. For example, for a WiFi-enabled mobile phone, the idle-listening power, which refers to the power consumed by the phone when the WiFi receiver (or radio) is waiting to receive potential packets while the phone is idle, can contribute to significant battery drainage if the radio is kept on for a long period of time. This problem can arise when the mobile phone attempts to retrieve a large piece of content, such as a movie, from other remote servers or devices. To avoid missing incoming packets, the mobile device's radio needs to be kept on for the duration the content-receiving process. Note that the time needed for the mobile device to receive the content is largely determined by the data rate at which the content provider is able to transmit the content. When the content provider experiences a traffic jam (e.g., when the content provider is overwhelmed by a large number of content requests), the transmission can take a relatively long time, during which the downloading mobile device's radio remains on, regardless of whether it is actively receiving packets, thus resulting in unwanted power consumption.

Various energy-management approaches have been proposed previously, including the possibility of placing the mobile device's receiver in an energy-saving sleep mode when the mobile device is not actively communicating, such as transmitting or receiving packets. However, to do so, the mobile device has to be able to estimate when other remote servers or devices are sending data to it and wake up at the right time. The estimation of the arrival time for a next packet can be challenging for a mobile device retrieving a large piece of content, because factors unknown to the mobile device, such as the current transmission data rate of the source device, determine the actual arrival time of the next packet. When the estimation is poor, the incoming packet may be lost, or if the content provider is another mobile device, that mobile device may lose power because of its continuous attempts to reach the mobile device whose receiver is sleeping.

To resolve such issues, in embodiments of the present invention, a mobile device can designate a separate device as its content-retrieving agent and delegate the content-retrieving task to its agent. The content-retrieving agent, upon receiving the content-retrieving task, will retrieve the content on behalf of the mobile device and store the retrieved content. In the meantime, the mobile device can place its receiver into the energy-saving sleep mode in order to extend its battery life. In one embodiment, the content-retrieving agent finishes downloading, wakes up the mobile device, and transmits the content to the mobile device at the full data rate of the agent. Alternatively, the content-retrieving agent waits for the mobile device to wake up on its own, and then transmits the content to the mobile device. If the mobile device is receiving and displaying the content from the agent concurrently, such as streaming and playing a video, the mobile device can place its receiver into sleep mode after a chunk of the video has been received in its buffer, play the video from its buffer, and then wake up to receive the next portion of the video after a predetermined amount of time. This process can repeat itself until the whole movie has been played. The amount of time that the receiver can be placed into the sleep mode between receipt of data packets depends upon the depth of the buffer. Note that the content-retrieving agent is aware of the mobile device's sleep/awake cycle, and will only transmit when the mobile device's receiver is awake.

In custodian-based routing, the content custodian is responsible for providing content to other requesting devices. In one embodiment, to delegate all content-retrieving tasks to its content-retrieving agent, a mobile device can blankly map all name space to the content-retrieving agent. Consequently, all content requests are directed to the content-retrieving agent, which is viewed as the custodian for all content. Upon receiving a content request, the agent first checks to see if the requested content is locally available; if so, it will provide the content to the requesting mobile device. If not, the agent verifies that the request is from the mobile device that the agent represents, and subsequently retrieves the content from a device or server that actually stores the content on behalf of the requesting mobile device.

FIG. 1 presents a diagram illustrating the exemplary system architecture for energy-efficient content retrieval in accordance with an embodiment of the present invention. System 100 includes a number of devices, such as a media server 102, smartphones 104-108, and a remote content server 110. Media server 102 and smartphones 104-108 are coupled to both a CCN 120 and a conventional network 130, such as an IP-based network. Remote content server 110 is coupled to conventional network 130.

For example, Bob, the user of smartphone 104, wants to view a family vacation video clip stored on his wife Alice's smartphone 106. Note that both Bob's smartphone 104 and Alice's smartphone 106 are coupled to CCN 120. The family vacation video clip has a content prefix/home_CCN/content/Alice's_phone/video/vacation. With custodian-based routing, smartphone 104 performs a content-prefix-to-custodian mapping to determine the custodian for the video clip. In a conventional setting, the mapping result indicates that Alice's phone 106 is the custodian of the requested video clip. Therefore, Bob's phone 104 will try to connect to Alice's phone 106 to download the video clip. However, Alice's phone 106 may be simultaneously engaged in other activities, such as answering connection requests from other devices. Hence, the downloading of the video can last for a long period of time, during which the receiver of Bob's phone 104 needs to stay on to avoid missing any incoming packets from Alice's phone 106. Keeping the receiver turned on for such a long period of time can contribute to the battery drainage of Bob's phone 104.

In order to prolong the battery life of Bob's phone 104, in one embodiment of the present invention, Bob's phone 104 delegates a device without energy constraints, such as media server 102, as its content-retrieving agent to retrieve the video clip from Alice's phone 106. To do so, Bob's phone 104 can place a prefix-to-custodian entry (PCE) capable of mapping any content name space to media server 102 in its local content-prefix-to-custodian-mapping table. To make sure that this PCE can be selected first under the normal longest-prefix-matching condition, in one embodiment, the system assigns an "administrative distance" for different types of routing entries, and resolves the routing entries in an increasing order. For example, standard custodian routing entries (normal PCEs) can be assigned a larger administration distance, such as 100, whereas local PCEs that map content name space to media server 102 are assigned a smaller administration distance, such as 50. Consequently, a custodian routing agent of Bob's phone 104 will first resolve routing entries with an administration distance of 50 before resolving routing entries with an administration distance of 100. If the attempt to resolve routing entries of the largest administration distance fails, the routing agent may need to contact an external agent to find a match. Because local routing entries are resolved first, media server 102 is marked as the custodian for the video clip despite the fact that media server 102 does not actually have the requested video clip. Upon determining that media server 102 is the custodian for the video, Bob's phone 104 establishes a connection with media server 102 to request the video clip.

In some embodiments, a device receiving a PCE verifies the PCE received from the CCN based on the signer and discards untrusted PCEs. Such validation may not be required for what is already stored on a device's prefix-to-custodian table. In addition, a custodian can only generate PCEs for itself; that is, the "device" of the PCE must be the custodian's own device. Such limitations prevent the propagation of bogus PCEs. For example, the PCE that maps all content to media server 102 is locally defined on Bob's phone 104, and will not propagate within the CCN. In general, such a PCE entry is stored in a local table on Bob's phone 104, and is not published and exchanged by the custodian routing protocol along with other normal PCEs.

When media server 102 receives the request for the video clip, it determines that it does not have the requested video clip. However, knowing that the request is coming from Bob's phone 104, which has delegated media server 102 as its content-retrieving agent, instead of responding to Bob's phone 104 with "content not found," media server 102 retrieves the video clip on behalf of Bob's phone. In one embodiment, media server 102 performs content-prefix-to-custodian mapping based on the prefix of the video clip, and the mapping returns Alice's phone 106 as the custodian of the video clip. Subsequently, media server 102 identifies an allowable communication endpoint on Alice's phone 106, establishes a connection to the identified communication endpoint, and obtains the video clip from Alice's phone 106. While media server 102 is downloading the video clip from Alice's phone 106, Bob's phone 104 can place its receiver in the energy-saving sleep mode, during which at least part of the circuitry of the receiver is powered off. In some cases, the reachable endpoints on Alice's phone 106 are associated with a set of restrictions. For example, one restriction may preclude devices other than Bob's phone 104 from connecting to those endpoints. Hence, under normal conditions, Alice's phone 106 will deny connection request from media server 102. To overcome such a problem, in one embodiment, media server 102 can attach a tag to its connection request specifying this connection request is made on behalf of Bob's phone 104, thus gaining access to Alice's phone 106. In this way, a mobile device can delegate its permission to access certain resources to a custodian.

In one embodiment, media server 102 finishes downloading the video clip from Alice's phone 106, and stores the video clip locally. Subsequently, Bob's phone 104 can power up its receiver to receive the video clip from media server 102, which transmits the video clip to Bob's phone 104 at a much higher data rate than would have been possible with Alice's phone 106. Consequently, to receive the same video clip, the receiver of Bob's phone 104 only needs to stay powered on for a shorter period of time, hence extending its battery life.

In addition to requesting content stored on devices coupled to CCN 120, a mobile device may also request content on devices not coupled to CCN 120. For example, Bob may want to download and view a movie on his smartphone 104 from remote content server 110, which is not coupled to CCN 120. Conventionally, smartphone 104 can obtain the movie using IP-based routing to connect to remote content server 110, and start streaming the movie. Note that the term "streaming" is used to indicate that multimedia data is provided over a network to the client computer device, such as Bob's phone 104, on a real-time, as-needed basis, rather than being pre-delivered before playback. As a result, Bob's phone 104 renders streaming data as it is received from remote content server 110, rather than waiting for the entire "file" of the movie to be delivered. The streaming speed and arrival time of each incoming packet depend on the traffic load of remote content server 110 and are unknown to Bob's phone 104. To avoid losing possible incoming packets, the receiver of Bob's phone 104 needs to stay on for almost the entire time it takes to play the movie, which can result in severe loss of battery power To save the battery power, in one embodiment of the present invention, instead of requesting a video streaming from remote content server 110, Bob's phone 104 makes the request including the universal resource locator (URL) of remote content server 110. Upon receiving the streaming request, media server 102 connects to remote content server 110 to download the video. While waiting for media server 102 to complete the download, Bob's phone 104 can place its receiver in sleep mode to save battery power. Once media server 102 completes the video download, it wakes up the receiver of Bob's phone 104, and starts streaming the video to Bob's phone 104.

During the video streaming process, because the time to play the video typically is longer than the time to receive the video, Bob's phone 104 can place its receiver in a periodic sleep/awake cycle. When its receiver is awake, Bob's phone 104 receives packets associated with the video from media server 102 at its full data rate, places the received packets in the buffer, and plays the video for Bob to view. After a predetermined amount of time, Bob's phone 104 places its receiver in sleep mode, ceases to receive packets from media server 102, but continues to play the video from the buffer. After sleeping for a predetermined amount of time, the receiver wakes up to start receiving subsequent packets associated with the video from media server 102. The duration that the receiver can remain in sleep mode can be determined by the buffer depth. Note that, because media server 102 is aware of the existence of the sleep/awake cycle of the receiver of Bob's phone 104, media server 102 stops transmission to Bob's phone 104 when the receiver is asleep, and resumes transmission when the receiver wakes up. Because its receiver goes into sleep periodically while streaming the video, Bob's phone 104 can significantly extend its battery life. In one embodiment, media server 102 can download the video from remote content server 110 and stream the video to Bob's phone 104 concurrently.

In a further embodiment, Bob's phone 104 may send a plurality of content requests, either in the form of CCN interest or URLs, to media server 102 simultaneously. Upon receiving the plurality of requests, media server 102 starts to retrieve that content on behalf of Bob's phone 104. At the same time, Bob's phone 104 places its receiver in sleep mode, and the content requests remain pending. After media server 102 finishes retrieving the content, the receiver of Bob's phone 104 wakes up and receives content pieces corresponding to the pending requests from media server 102.

In addition, Bob's phone 104 may send a single request, such as a single CCN interest, to media server 102. Such a single interest can signal media server 102 to generate a plurality of CCN interests on behalf of Bob's phone 104. For example, Bob's phone 104 may send a single interest to media server 102 requesting family vacation photos, which may be stored in a number of devices within Bob's family CCN. In response, media server 102 generates a plurality of interest to request the various pieces of content from the devices on behalf of Bob's phone 104. After receiving and saving these content pieces, media server 102 wakes ups the receiver and transmits these content pieces to Bob's phone 104.

Figure 2:
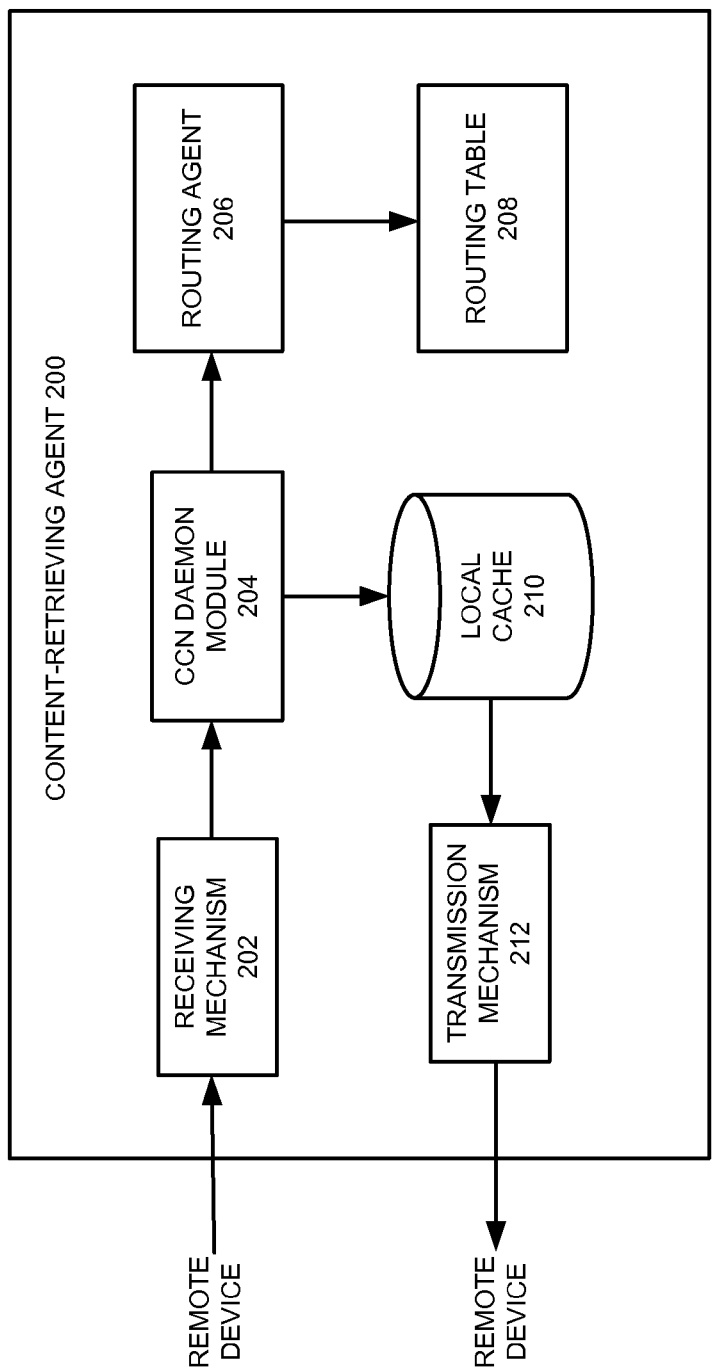
FIG. 2 presents a diagram illustrating the architecture of an exemplary content-retrieving agent in accordance with an embodiment of the present invention.

FIG. 2 presents a diagram illustrating the architecture of an exemplary content-retrieving agent in accordance with an embodiment of the present invention. Content-retrieving agent 200 includes a receiving mechanism 202, a CCN daemon module 204, a routing agent 206, a routing table 208, a local cache 210, and a transmission mechanism 212.

During operation, receiving mechanism 202 receives a content request from a mobile device it represents. Receiving mechanism 202 passes the received request to CCN daemon module 204, which is configured to run a background process for the CCN. In one embodiment, the request is in the form of a CCN interest. In a further embodiment, the mobile device maps all content it requests to its content-retrieving agent 200, regardless of whether or not content-retrieving agent 200 stores the requested content. CCN daemon module 204 checks local cache 210 to determine whether the content is available locally. If so, transmission mechanism 212 transmits the requested content to the remote device. If not, CCN daemon module 204 contacts routing agent 206 to obtain routing information associated with the requested content in order to identify its custodian. In one embodiment, routing agent 206 obtains the routing information, which includes the content-prefix-to-custodian mapping, from routing table 208.

Once the actual custodian of the content is identified, content-retrieving agent 200 establishes a connection with the actual custodian and obtains the requested content on behalf of the requesting mobile device. Content-retrieving agent 200 stores the content in local cache 210, and transmission mechanism 212 transmits the requested content to the mobile device. By storing the content in local cache 210, content-retrieving agent 200 can provide the cached copy of the content to any requesting mobile device in a later time.

Figure 3:
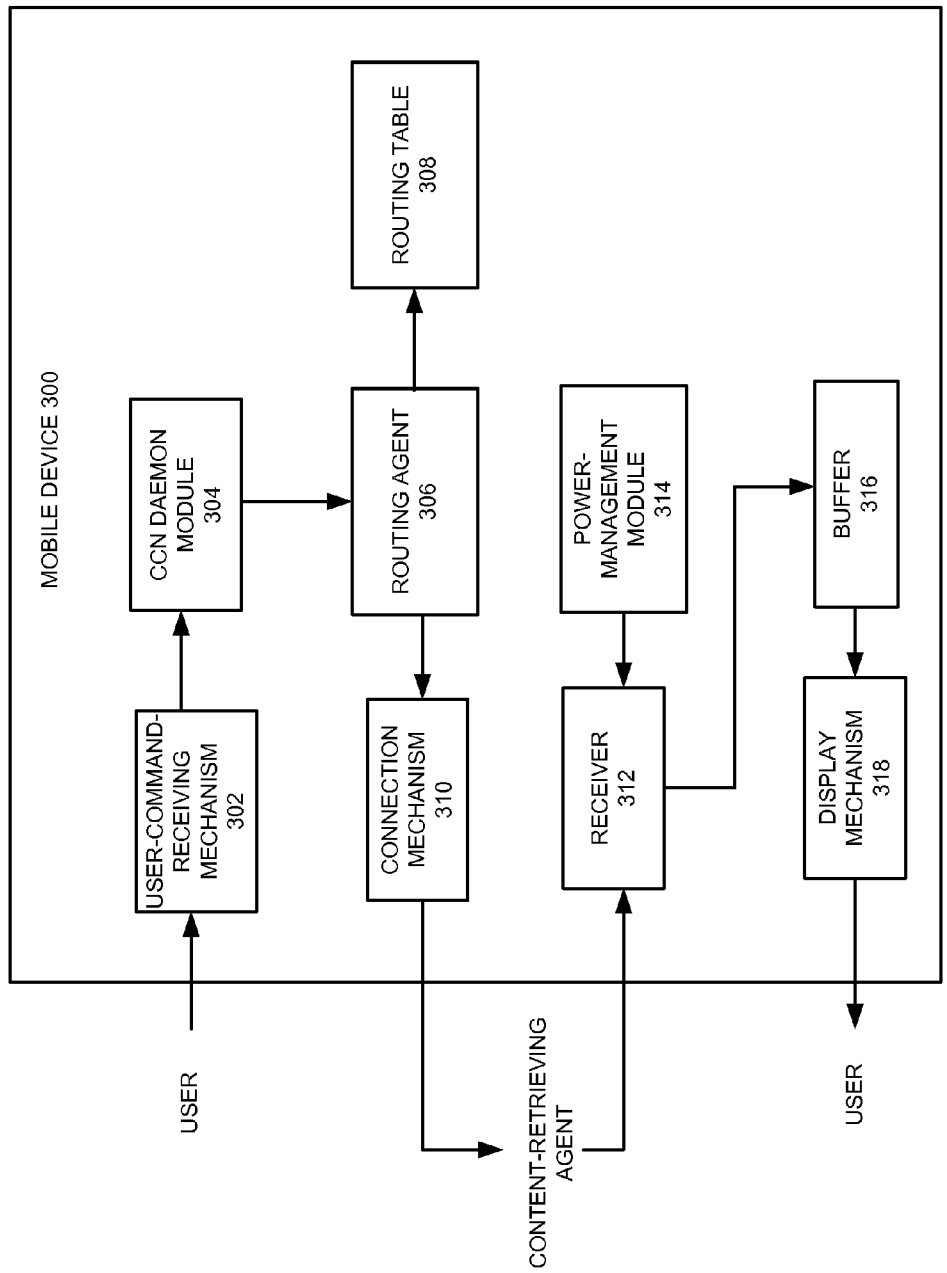
FIG. 3 presents a diagram illustrating the architecture of an exemplary mobile device in accordance with an embodiment of the present invention.

FIG. 3 presents a diagram illustrating the architecture of an exemplary mobile device in accordance with an embodiment of the present invention. Mobile device 300 includes a user-command-receiving mechanism 302, a CCN daemon module 304, a routing agent 306, a routing table 308, a connection mechanism 310, a receiver 312, a power-management module 314, a buffer 316, and a display mechanism 318.

During operation, user-command-receiving mechanism 302 receives a content request from the user, and passes the received request to CCN daemon module 304, which is configured to run a background process for the CCN. In one embodiment, the request is in the form of a CCN interest. CCN daemon module 304 contacts routing agent 306 to obtain routing information associated with the requested content. In one embodiment, routing agent 306 obtains the routing information, which includes the content-prefix-to-custodian mapping, from routing table 308. In a further embodiment, routing table 308 includes a PCE that maps the requested content prefix to the content-retrieving agent serving mobile device 300. In response to the mapping, connection mechanism 310 establishes a connection with the content-retrieving agent to request the content. The content-retrieving agent, in turn, obtains the content from the actual custodian of the content on behalf of mobile device 300, and transmits the content to mobile device 300 via receiver 312, which is coupled to power-management module 314. While the content-retrieving agent is obtaining the content from the actual content custodian, power-management module 314 places receiver 312 in an energy-saving sleep mode. When the content-retrieving agent finishes obtaining the content, power-management module 314 wakes up receiver 312 in order for receiver 312 to receive the content. In one embodiment, receiver 312 can start streaming the content from the content-retrieving agent before the content-retrieving agent finishes obtaining the content from its custodian. During the streaming process, receiver 312 stores the received portions of content in buffer 316, and display mechanism 318 displays the content to the user from buffer 316. Note that, while streaming the content from the content-retrieving agent, receiver 312 is periodically placed into the energy-saving sleep mode.

Figure 4:
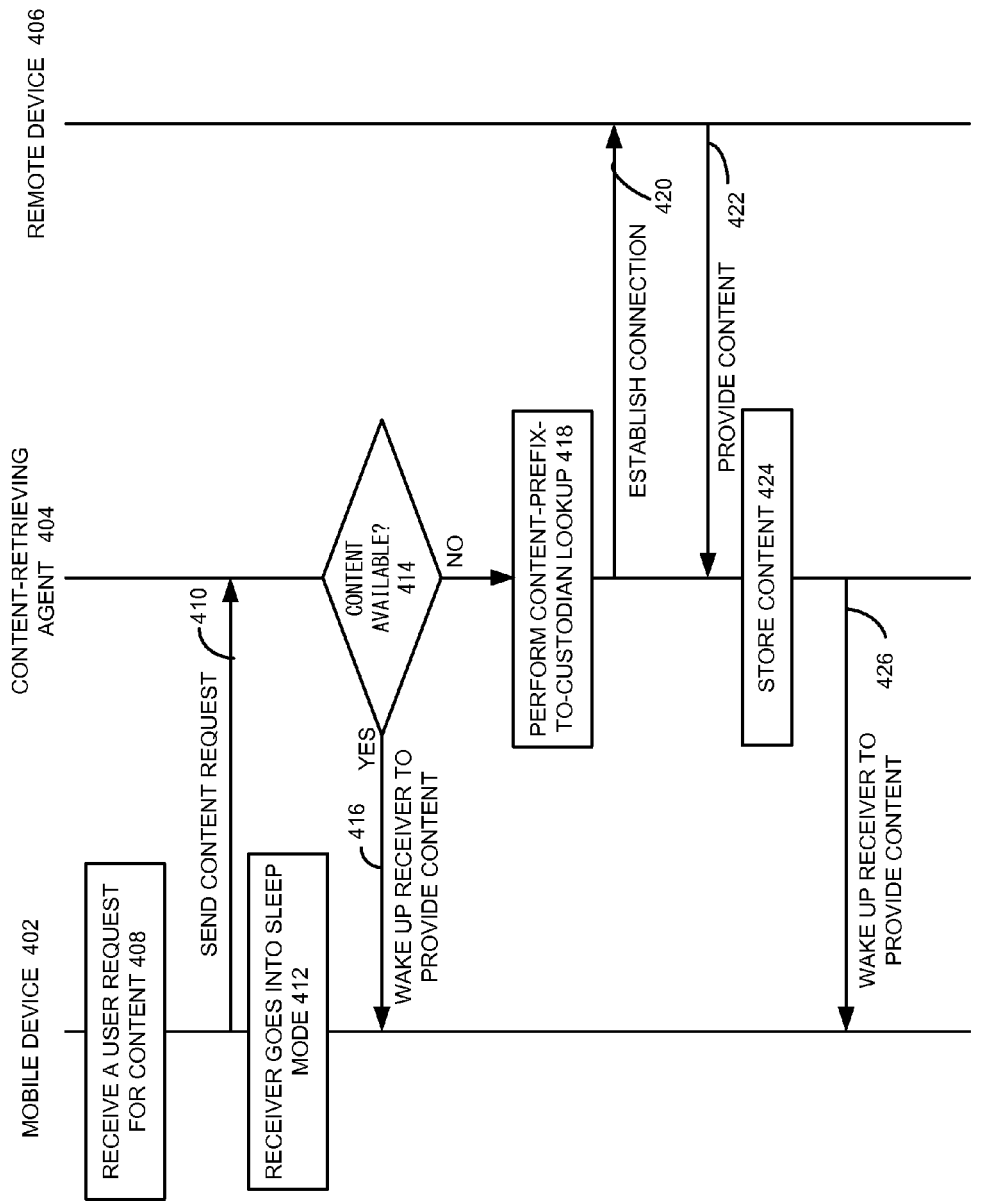
FIG. 4 presents a time-space diagram illustrating the process of a mobile device obtaining a piece of content from a remote device via a content-retrieving agent in accordance with an embodiment of the present invention.

FIG. 4 presents a time-space diagram illustrating the process of a mobile device obtaining a piece of content from a remote device via a content-retrieving agent in accordance with an embodiment of the present invention. During operation, a mobile device 402 receives a request from its user for a piece of content that is not available locally (operation 408). Upon receiving the request, mobile device 402 forwards the content request to a content-retrieving agent 404 (operation 410). To save its battery power, mobile device 402 places its receiver in an energy-saving sleep mode (operation 412). Upon receiving the content request, content-retrieving agent 404 determines whether it actually has a copy of the content (operation 414). If so, content-retrieving agent content-retrieving agent 404 wakes up the receiver of mobile device 402 to provide the requested content to mobile device 402 (operation 416). Otherwise, content-retrieving agent 404 identifies the actual custodian of the requested content (operation 418). In one embodiment, content-retrieving agent 404 performs a content-prefix-to-custodian lookup to identify the actual custodian. Note that, in a non-CCN environment, content-retrieving agent 404 may identify a remote device storing the content via a URL.

Once content-retrieving agent 404 identifies that remote device 406 stores the requested content, it establishes a connection to remote device 406 to request the content (operation 420). In one embodiment, content-retrieving agent 404 establishes a connection to remote device 406 by performing a custodian-to-communication-endpoint mapping and a communication-endpoint-to-physical-address mapping. The custodian-to-communication-endpoint mapping information provides a mapping between a custodian and the endpoint that enables potential paths to the given custodian. In one embodiment, the custodian-to-communication-endpoint mapping information is included in a custodian-to-communication-endpoint mapping table that is exchanged among devices within the CCN. In the custodian-to-communication-endpoint mapping table, each device within the CCN has a corresponding entry, which includes an array of Custodian Endpoint Entries (CEEs) corresponding to all the endpoints belonging to the device. For example, the entry corresponding to remote device 406 may include a WiFi interface, a cellular 3 G interface, and a Bluetooth interface.

The communication-endpoint-to-physical-address mapping provides information needed for the rendezvous between devices. Such mapping information can be stored within the custodian-to-communication-endpoint mapping table, or it can be stored in a third-party service, such as a public SIP server, that provides the rendezvous service. For example, remote device 406 can register its SIP address with a public SIP server.

Upon establishment of the connection, remote device 406 provides the requested content to content-retrieving agent 404 (operation 422). Upon receiving the content, content-retrieving agent 404 stores the content (operation 424), and wake ups the receiver of mobile device 402 to provide the content to mobile device 402 (operation 426).

By placing the receiver of mobile device 402 into sleep mode while content-retrieving agent 404 is obtaining the content, which can take a long period of time, mobile device 402 can significantly save its battery power.

Figure 5:
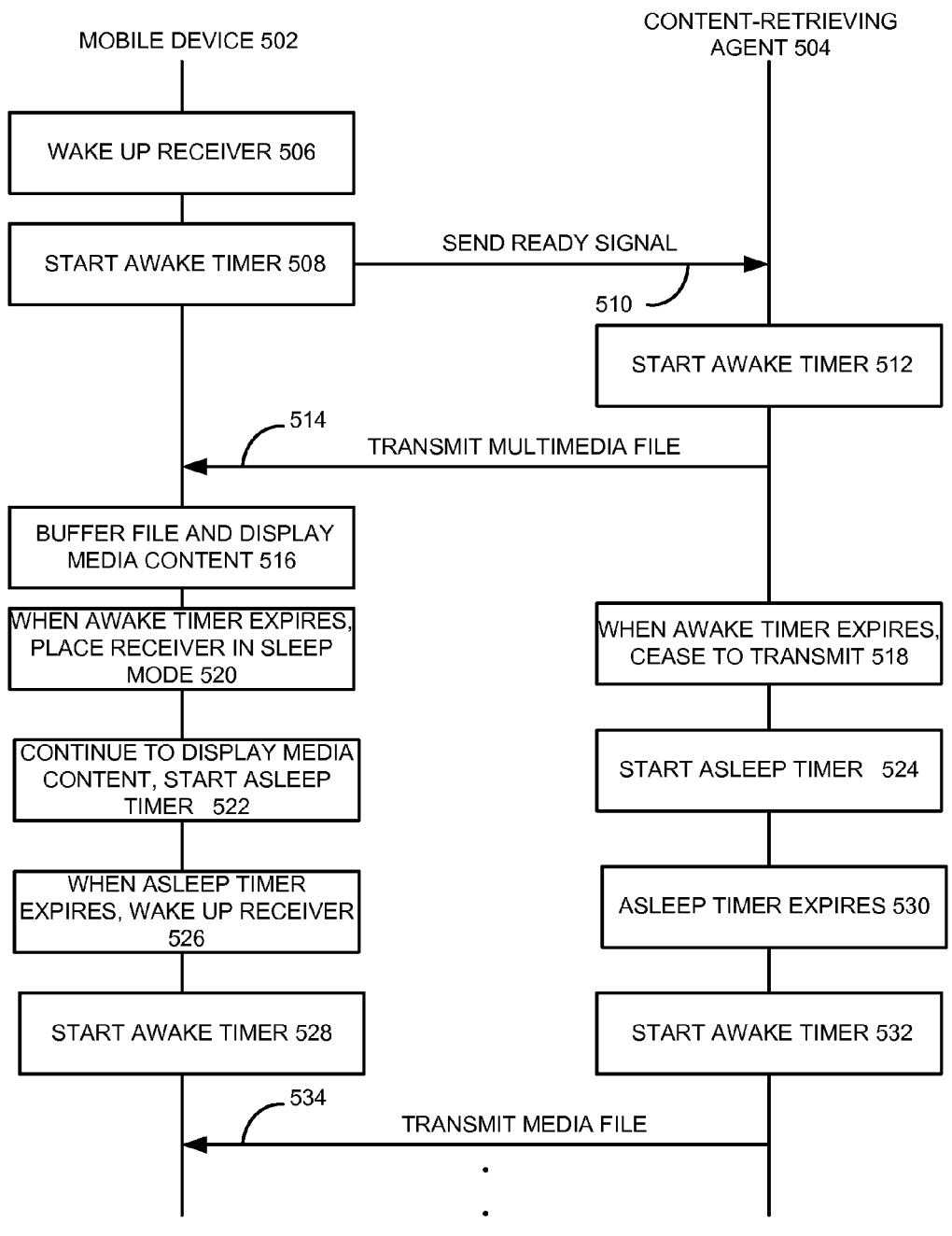
FIG. 5 presents a time-space diagram illustrating the process of a mobile device streaming data from its content-retrieving agent in accordance with an embodiment of the present invention.

FIG. 5 presents a time-space diagram illustrating the process of a mobile device streaming data from its content-retrieving agent in accordance with an embodiment of the present invention. During operation, a mobile device 502 gets ready to start streaming a multimedia file from its content-retrieving agent 504 by placing its receiver in an awake mode (operation 506). Note that content-retrieving agent 504 has obtained either the whole or part of the multimedia file from a remote device on behalf of mobile device 502. Subsequently, mobile device 502 starts an awake timer (operation 508), and notifies content-retrieving agent 504 that it is ready to stream the content (operation 510). In one embodiment, mobile device 502 sends a "ready" signal to content-retrieving agent 504 indicating it is ready for receiving. Upon receiving the notification, content-retrieving agent 504 also starts an awake timer (operation 512), and begins transmitting the multimedia file (operation 514).

Mobile device 502 buffers the received multimedia file and concurrently displays the media content (operation 516). When its awake timer expires, content-retrieving agent 504 ceases to transmit (operation 518). In the meantime, the awake timer on mobile device 502 also expires, and mobile device 502 places its receiver in an energy-saving sleep mode (operation 520). While its receiver is asleep, mobile device 502 continues to display the media content from its buffer and starts an asleep timer (operation 522). Content-retrieving agent 504 also starts an asleep timer synchronized with the asleep timer on mobile device 502 (operation 524).

When its asleep timer expires, mobile device 502 wakes up its receiver (operation 526), and starts its awake timer (operation 528). In the meantime, the asleep timer on content-retrieving agent 504 also expires (operation 530), and content-retrieving agent 504 starts an awake timer (operation 532), and resumes transmitting the media file to mobile device 502 (operation 534). The process repeats itself until the entire media file has been received by mobile device 502. Note that, instead of maintaining a synchronized asleep timer on content-retrieving agent 504, it is also possible for mobile device 502 to transmit a "ready" signal to content-retrieving agent 504 when its receiver wakes up.

By placing its receiver periodically in sleep mode during content streaming, mobile device 502 can significantly extend its battery life.

Computer and Communication System

Figure 6:
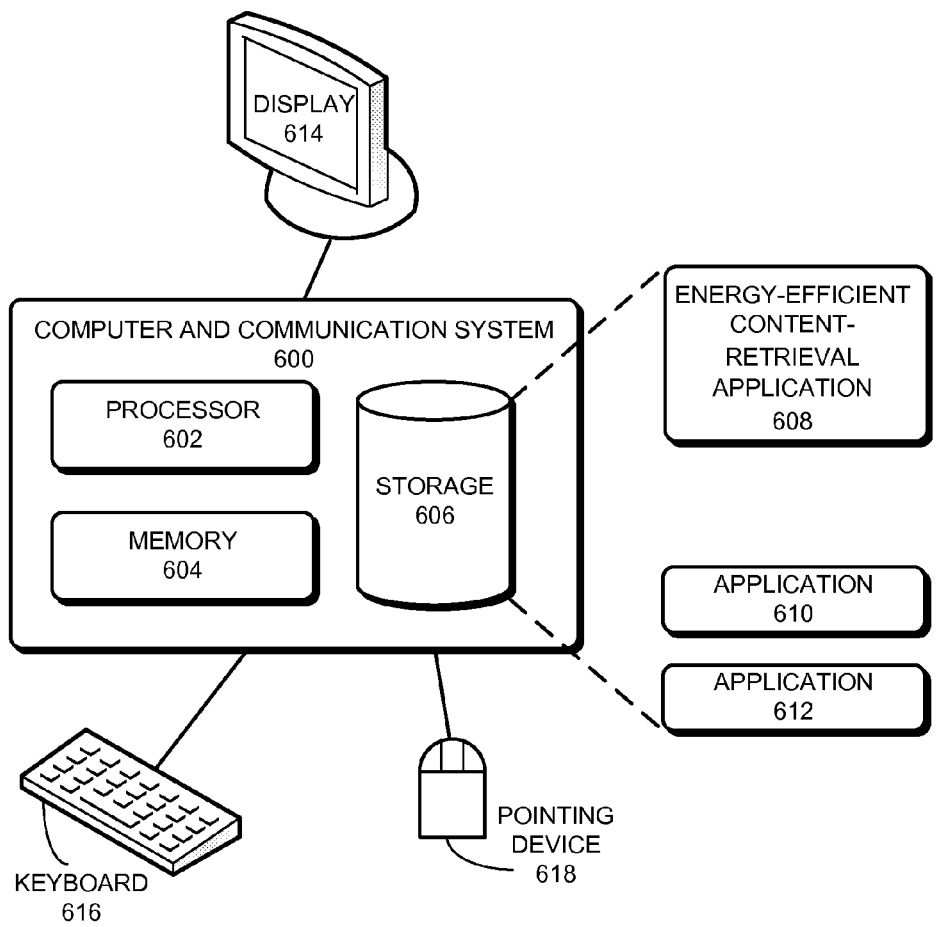
FIG. 6 presents an exemplary computer system for facilitating energy-efficient content retrieval in custodian-based routing over a CCN in accordance with an embodiment of the present invention.

FIG. 6 presents an exemplary computer system for facilitating energy-efficient content retrieval in custodian-based routing over a CCN in accordance with an embodiment of the present invention. In FIG. 6, a computer and communication system 600 includes a processor 602, a memory 604, and a storage device 606. Storage device 606 stores programs to be executed by processor 602. Specifically, storage device 606 stores an energy-efficient content-retrieval application 608, as well as other applications, such as applications 610 and 612. During operation, energy-efficient content-retrieval application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
    receiving, by a mobile device, a request from a user for a piece of content;
    determining a content-retrieving agent for the mobile device, wherein the content-retrieving agent is configured to obtain the content on behalf of the mobile device, wherein determining the content-retrieving agent involves:
        performing a lookup, using the content's name, to identify the content-retrieving agent for the content;
    forwarding the request to the content-retrieving agent which is configured to obtain and store the requested content on behalf of the mobile device;
    placing the mobile device's receiver in an energy-saving sleep mode while the content-retrieving agent is obtaining the requested content from a remote device and is not transmitting the content to the mobile device, wherein placing the mobile device's receiver in an energy-saving sleep mode involves turning off power to a portion of the mobile device's receiver;
    receiving, from the content-retrieving agent, a wake-up message indicating that the content-retrieving agent has stored the requested content and is transmitting the content to the mobile device;
    in response to determining that the content-retrieving agent is transmitting the content to the mobile device, waking up the mobile device's receiver from the energy-saving sleep mode; and
    receiving the content, at the mobile device, from the content-retrieving agent.

2. The method of claim 1, wherein the mobile device, the content-retrieving agent, and/or the remote device are coupled to each other via a content-centric network (CCN).

3. The method of claim 2,
    wherein the content is mapped to the content-retrieving agent, regardless of whether or not the content is stored on the content-retrieving agent.

4. The method of claim 2, wherein obtaining the content from the remote device involves the content-retrieving agent identifying the remote device by performing a lookup based on the content's name.

5. The method of claim 1, wherein the receiver is placed in the energy-efficient sleep mode for a predetermined amount of time before waking up.

6. The method of claim 1, further comprising notifying the content-retrieving agent that the receiver is waking up and is ready to receive the content.

7. The method of claim 1, wherein the mobile device starts receiving the content from the content-retrieving agent after the content-retrieving agent obtains at least part of the content.

8. The method of claim 1, further comprising receiving a cached copy of the content from the content-retrieving agent at a later time.

9. A non-transitory computer-readable storage medium storing instructions that when executed by a computer cause the computer to perform a method, the method comprising:
    receiving, at a mobile device, a request from a user for a piece of content;
    determining a content-retrieving agent for the mobile device, wherein the content-retrieving agent is configured to obtain the content on behalf of the mobile device, wherein determining the content-retrieving agent involves:
        performing a lookup, using the content's name, to identify the content-retrieving agent for the content;
    forwarding the request to the content-retrieving agent which is configured to obtain and store the requested content on behalf of the mobile device;
    placing the mobile device's receiver in an energy-saving sleep mode while the content-retrieving agent is obtaining the requested content from a remote device and is not transmitting the content to the mobile device, wherein placing the mobile device's receiver in an energy-saving sleep mode involves turning off power to a portion of the mobile device's receiver;
    receiving, from the content-retrieving agent, a wake-up message indicating that the content-retrieving agent has stored the requested content and is transmitting the content to the mobile device;
    in response to determining that the content-retrieving agent is transmitting the content to the mobile device, waking up the mobile device's receiver from the energy-saving sleep mode; and
    receiving the content, at the mobile device, from the content-retrieving agent.

10. The computer-readable storage medium of claim 9, wherein the mobile device, the content-retrieving agent, and/or the remote device are coupled to each other via a content-centric network (CCN).

11. The computer-readable storage medium of claim 10,
    wherein the content is mapped to the content-retrieving agent, regardless of whether or not the content is stored on the content-retrieving agent.

12. The computer-readable storage medium of claim 10, wherein obtaining the content from the remote device involves the content-retrieving agent identifying the remote device by performing a lookup based on the content's name.

13. The computer-readable storage medium of claim 9, wherein the receiver is placed in the energy-efficient sleep mode for a predetermined amount of time before waking up.

14. The computer-readable storage medium of claim 9, wherein the method further comprises notifying the content-retrieving agent that the receiver is waking up and is ready to receive the content.

15. The computer-readable storage medium of claim 9, wherein the mobile device starts receiving the content from the content-retrieving agent after the content-retrieving agent obtains at least part of the content.

16. The computer-readable storage medium of claim 9, wherein the method further comprises receiving a cached copy of the content from the content-retrieving agent at a later time.

17. A mobile device, comprising:
a request-receiving mechanism configured to receive a request from a user for a piece of content;
a forwarding mechanism configured to:
  determining a content-retrieving agent for the mobile device, wherein the content-retrieving agent is configured to obtain the content on behalf of the mobile device, wherein determining the content-retrieving agent involves performing a lookup, using the content's name, to identify the content-retrieving agent for the content; and
  forward the request to the content-retrieving agent, which is configured to obtain and store the requested content on behalf of the mobile device;
a receiver configured to receive the content from the content-retrieving agent; and
a power-management module configured to:
  place the receiver in an energy-saving sleep mode while the content-retrieving agent is obtaining the requested content from a remote device and is not transmitting the content to the mobile device, wherein placing the mobile device's receiver in an energy-saving sleep mode involves turning off power to a portion of the mobile device's receiver;
  receive, from the content-retrieving agent, a wake-up message indicating that the content-retrieving agent has stored the requested content and is transmitting the content to the mobile device; and
  wake up the mobile device's receiver from the energy-saving sleep mode in response to determining that the content-retrieving agent is transmitting the content to the mobile device.

18. The mobile device of claim 17, wherein the mobile device, the content-retrieving agent, and/or the remote device are coupled to each other via a content-centric network (CCN).

19. The mobile device of claim 18, wherein the content is mapped to the content-retrieving agent regardless of whether or not the content is stored on the content-retrieving agent.

20. The mobile device of claim 18, wherein obtaining the content from the remote device involves the content-retrieving agent identifying the remote device by performing a lookup based on the content's name.

21. The mobile device of claim 17, wherein the power-management module is configured to place the receiver in the energy-efficient sleep mode for a predetermined amount of time before waking up.

22. The mobile device of claim 17, further comprising a notification mechanism configured to notify the content-retrieving agent that the receiver is waking up and is ready to receive the content.

23. The mobile device of claim 17, wherein the receiver is configured to receive the content after the content-retrieving agent obtains at least a portion of the content.

24. The mobile device of claim 17, wherein the receiver is further configured to receive a cached copy of the content from the content-retrieving agent at a later time.

* * * * *